United States Patent [19]

Thedford

[11] Patent Number: 5,094,064
[45] Date of Patent: Mar. 10, 1992

[54] DUCT SYSTEM FOR A COTTON HARVESTER

[75] Inventor: G. Neil Thedford, Naperville, Ill.

[73] Assignee: J. I. Case Company, Racine, Wis.

[21] Appl. No.: 627,255

[22] Filed: Dec. 14, 1990

[51] Int. Cl.$^5$ ............................................. A01D 46/10
[52] U.S. Cl. ............................................ 56/30; 56/12.8; 56/32
[58] Field of Search ................... 56/13.3, 12.8, 28, 30, 56/32

[56] References Cited

U.S. PATENT DOCUMENTS

| | | |
|---|---|---|
| 3,515,437 | 6/1970 | Copley et al. |
| 4,501,112 | 2/1985 | Thedford et al. ................... 56/13.3 |
| 4,660,359 | 4/1987 | Deutsch ............................... 56/13.3 |
| 4,821,497 | 4/1989 | Deutsch et al. ...................... 56/30 |
| 4,928,459 | 5/1990 | Thedford et al. .................... 56/13.3 |

Primary Examiner—Terry Lee Melius
Attorney, Agent, or Firm—Dressler, Goldsmith, Shore, Sutker & Milnamow, Ltd.

[57] ABSTRACT

A cotton harvester duct system for pneumatically transporting cotton from a harvesting unit toward a receptacle. The duct structure has a generally horizontal section leading from an opening and joined to a generally vertical section extending in a generally straight line alignment with a conveyor tube. An air nozzle extends to an interior of the duct structure for propelling cotton through the duct structure upwardly through the conveyor tube. The air nozzle is mounted upstream from the opening at a foremost lower location and adjacent a wall of the vertical duct section.

4 Claims, 2 Drawing Sheets

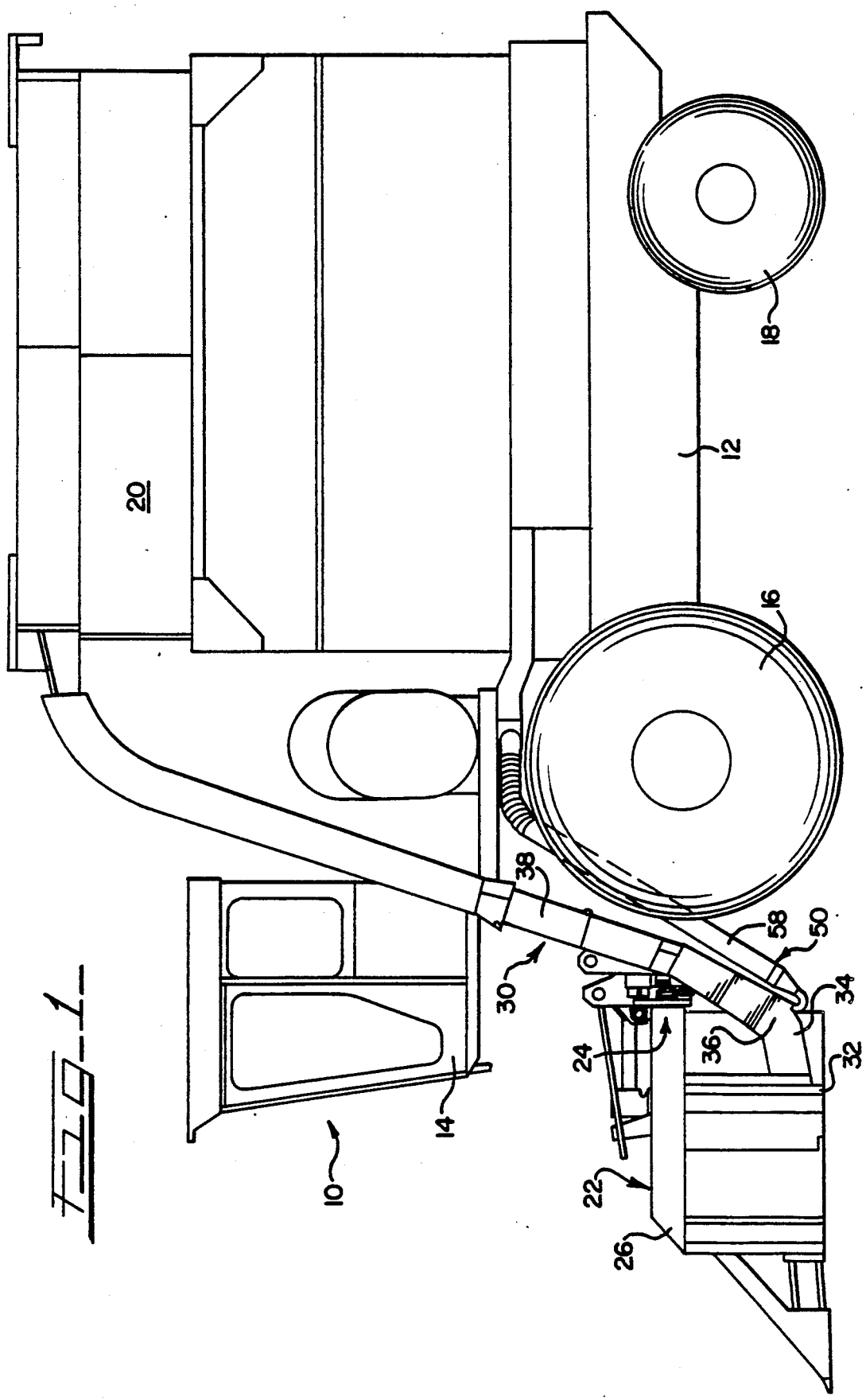

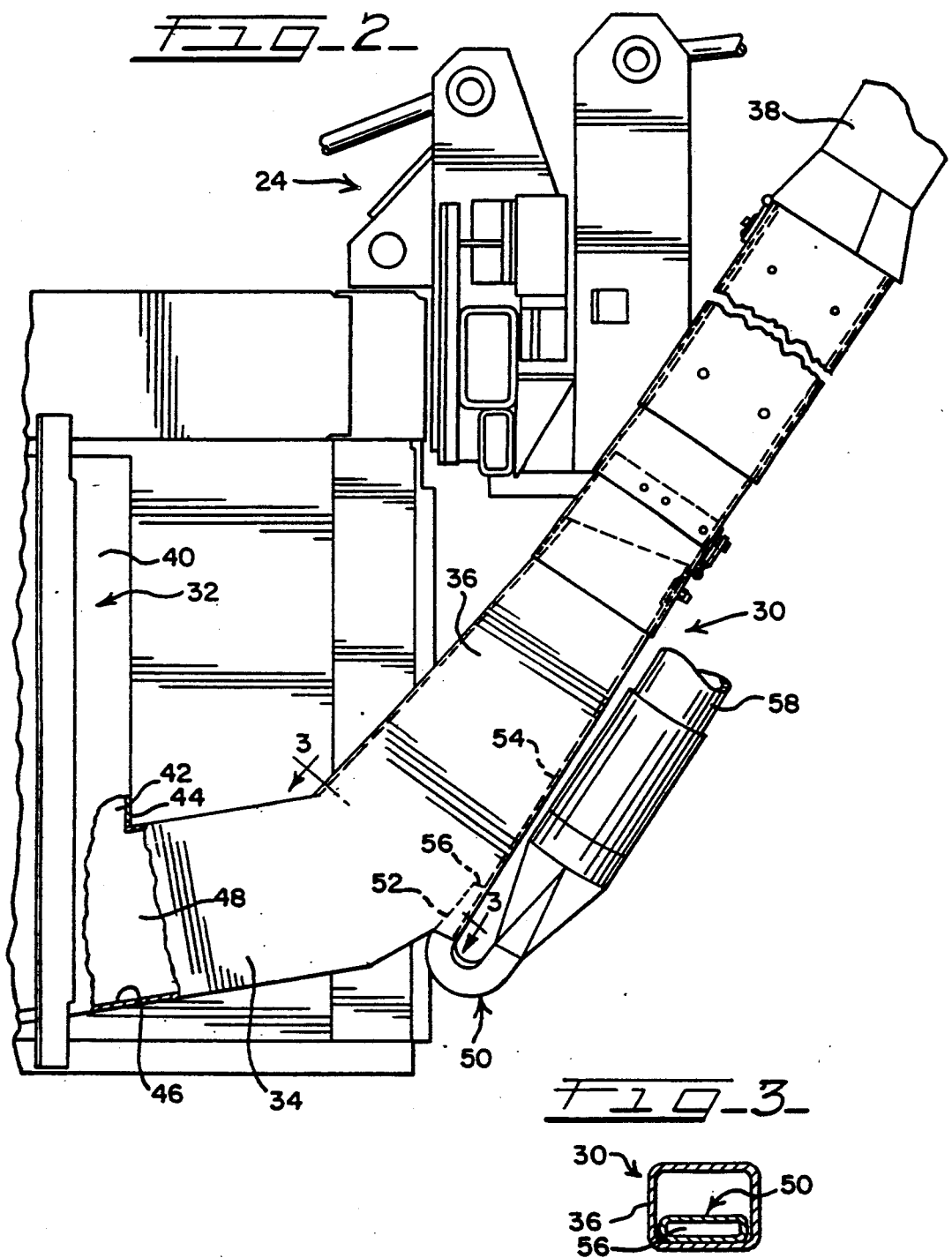

DUCT SYSTEM FOR A COTTON HARVESTER

FIELD OF THE INVENTION

The present invention generally relates to cotton harvesters and, more particularly, to a duct system for pneumatically transporting cotton from a harvesting unit of a cotton harvester.

BACKGROUND OF THE INVENTION

A typical cotton harvester includes a plurality of harvesting units supported at a forward end of a wheeled frame. Each harvesting unit includes a harvesting mechanism which picks or strips cotton from rows of cotton plants passing through a plant passage defined by each harvesting unit. Recent harvesting mechanisms include an upright picker rotor assembly including a series of vertically spaced picker spindles arranged in combination with a rotary doffer assembly. After the cotton is picked from the plants, the doffer assembly forcibly removes the cotton from the spindles and projects it rearwardly from the harvesting unit.

Some cotton harvesters presently utilize a pneumatic conveyor system which conveys cotton from the harvesting unit to a cotton receptacle typically located on the frame of the harvester. Some cotton conveyor systems typically include an upright discharge compartment which is of generally co-equal length with the height of the doffer assembly and receives the doffed cotton therefrom. The doffed cotton strikes a baffle or rear panel structure in the discharge compartment and then drops downwardly through a free fall zone to a cotton receiving suction opening at the lower end of the discharge compartment. The duct structure rearwardly extends from the suction opening and connects the discharge compartment with the cotton receptacle on the harvester. The duct structure may have one or more bends or turns along its length to compensate for the geometry of the harvester between the harvesting unit and the receptacle.

A stream of air directed into the duct structure at a location downstream of the opening creates a vacuum at the opening and induces a draft in the discharge compartment. The doffed cotton is sucked through the opening and toward an air nozzle typically used to create such a stream of air directed through the duct structure. The air stream blown from the air nozzle is sufficient to propel the cotton upstream through the duct structure and into the cotton receptacle.

Copley et al. U.S. Pat. No. 3,515,437 discloses that the entrance of air into the duct structure is in a rear wall thereof. A major problem associated with the duct design illustrated in the Copley et al. patent is the location of the air nozzle. Locating the air nozzle relatively high on the duct structure, as shown in the Copley et al. patent, significantly reduces the drawing effect within a suction area in which cotton will be initially entrained for movement toward the air nozzle. Thus, locating the air nozzle relatively high in the duct structure significantly increases the susceptibility of the duct to plugging with cotton.

Another major problem with pre-existing designs having the air nozzle inserted in a rear wall of the duct structure involves changes in direction of the air flow. As mentioned, some duct designs are configured with bends and twists along their length to compensate for the geometry of the harvester. Notably, the duct system of a cotton harvester directs not only air but also entrained cotton toward the cotton receptacle. Redirection of the air and cotton flowing past the bends and twists of the duct structure decreases the efficiency of operation.

Besides being more expensive, larger motors and compressors have failed to compensate for the losses in efficiency of operation inherent with heretofore known duct designs. Moreover, larger and therefore more expensive motors and compressors have not reduced the susceptibility of the duct system to plugging in high yield cotton harvesting conditions.

SUMMARY OF THE INVENTION

In line with the above, and in accordance with the present invention, there is provided a cotton harvester duct system for pneumatically transporting cotton from a harvesting unit toward a cotton receptacle on the harvester. The duct system includes a duct structure having an opening generally exposed to and receiving cotton from the harvesting unit. The duct structure has a generally horizontal duct section leading away from the opening and joined to a generally vertical duct section which extends in generally straight-line alignment and cotton conveying relation with a conveyor tube leading to the cotton receptacle. Air nozzle means extend to an interior of the duct structure for creating a low pressure area downstream of said nozzle means thereby drawing cotton through the opening and propelling the cotton toward the receptacle. The air nozzle is mounted upstream from the opening at a foremost lower location of the vertical duct section to minimize the length of the entrained suction area extending between the nozzle and the opening thereby reducing the susceptibility of the duct structure to plugging. Moreover, the air nozzle is located such that entrained cotton and air is propelled from an outlet end of the nozzle along a generally straight line path extending upwardly through the vertical section of the duct structure and through the conveyor tube toward the cotton receptacle.

In a most preferred form of the invention, the duct structure has a generally rectangular cross-sectional walled configuration at the forward and lowermost end of the vertical duct section. The outlet of the air nozzle extends substantially across the duct structure.

The air nozzle passes through a wall of the duct structure and is secured thereto. In a preferred form of the invention, the air nozzle includes a tapered portion with an outlet end being at the small end of the air nozzle. Air is introduced at a relatively low velocity into the air nozzle and is discharged at a comparatively high velocity at an outlet end of the air nozzle.

The generally straight line path of air and entrained cotton leading from the outlet of the air nozzle provides a system which is more efficient in the delivery of cotton from the harvesting unit to the cotton receptacle. Locating the air nozzle within the duct structure so as to minimize the entrained suction length reduces the volumetric requirements to produce an efficient air flow through the duct system. Moreover, the efficiency of an air nozzle located closely adjacent the suction opening increases the capacity of the duct structure to handle cotton in high yield harvesting conditions.

Numerous other features and advantages of the present invention will become readily apparent from the following detailed description, the accompanying drawings, and the appended claims.

BRIEF DESCRIPTION OF THE DRAWINGS

FIG. 1 is a side elevational view of a cotton harvester with a duct system embodying the principles of the present invention attached thereto;

FIG. 2 is an enlarged side elevational view showing a lowermost end of the duct system connected to a harvesting unit of the cotton harvester; and FIG. 3 is a sectional view taken along line 3—3 of FIG. 2.

DETAILED DESCRIPTION

While the present invention is susceptible of embodiment in various forms, there is shown in the drawings a presently preferred embodiment hereinafter described with the understanding that the present disclosure sets forth an exemplification of the invention which is not intended to limit the invention to the specific embodiment illustrated.

Referring now to the drawings, wherein like reference numerals indicate like parts throughout the several views, there is shown in FIG. 1 a self-propelled cotton harvester 10. The cotton harvester 10 includes a fore-and-aft extending frame 12, having an operator station 14 arranged at a forward end thereof. The frame 12 is supported on a front pair of ground engaging drive wheels 16 and a pair of ground engaging steering wheels 18 which provide the harvester 10 with proper direction. In the preferred embodiment, a cotton receiving basket 20 or receptacle is mounted on the frame 12.

A plurality of harvesting units 22 are supported at a forward end of the harvester frame 12. The harvesting units 22 are connected to the frame in side-by-side order for harvesting adjacent and generally parallel rows of cotton as the harvester moves over a field of cotton. The harvesting units are supported at a forward end of the harvester by a mounting system 24 allowing for vertical and lateral movements of the harvesting units relative to the frame of the harvester.

In a preferred form of the invention, each harvesting unit is substantially similar in structure. Each harvesting unit includes a housing assembly 26 defining a fore-and-aft crop receiving opening or plant passage. Each harvesting unit further includes a rotary harvesting mechanism supported upright within the housing assembly 26. In a preferred form of the invention, such rotary harvesting mechanisms include forward and rear upright picker rotor assemblies (not shown) arranged adjacent the plant passage for removing cotton from the plants as the harvester is driven across the field. Adjacent the picker rotor assemblies are conventional upright doffer assemblies (not shown). During operation of the harvester, the doffer assemblies remove or doff cotton from the picker rotor assemblies and propel the doffed cotton outwardly through discharge openings defined by the housing assembly 26.

The cotton harvester 10 further includes a cotton conveying structure for directing cotton removed from the cotton plants toward the cotton receiving receptacle or basket 20. In the illustrated embodiment, the cotton conveying structure includes a discharge duct assembly 30 leading from each doffer assembly on a harvesting unit. Each discharge duct assembly defines an elongated passage through which cotton is adapted to flow and which opens at one end to receive the cotton rearwardly discharged from the doffer assembly and opens at an opposite end to exhaust cotton into the cotton receptacle 20.

In the illustrated embodiment, each discharge duct assembly includes an upright discharge compartment 32, a generally horizontal duct section 34 leading from the discharge compartment 32, a generally vertical section 36 joined to duct section 34, and an upwardly extending conveyor tube 38 which opens to and depends from basket 20. As shown, the generally vertical upright section 36 and conveyor tube 38 extend upwardly in generally straight line alignment and are arranged in cotton conveying relationship relative to each other.

As shown in FIG. 2, the discharge compartment 32 includes side walls 40 and 42 transversely separated by a rear panel structure 44. As is conventional, at its forward end, the discharge compartment 32 opens along substantially the entire length of the doffer assembly (not shown) on the harvesting unit to receive cotton therefrom. The rear panel structure 44 terminates above a bottom wall 46 of the compartment to define a suction opening 48 at the lower rear end of the compartment.

Each discharge duct assembly 30 further includes an air nozzle 50 extending to an interior of the duct structure for drawing cotton toward the suction opening 48 and for propelling cotton through the conveyor tube 38 to the cotton receptacle. The air nozzle 50 includes an air jet 52 which is mounted at a foremost lower location of the vertical duct section 36. In the illustrated embodiment, the air nozzle 50 is mounted adjacent a rear wall 54 of the generally vertical duct section 36 of the duct assembly 30. It should be appreciated, however, that the air nozzle 50 could likewise be mounted in either a side wall or front wall of the generally vertical duct section 36 without detracting from the spirit and scope of the present invention.

As shown, the air jet 52 tapers from a relatively large end to an outlet 56 facing upwardly into the duct assembly 30 in substantially straight line alignment with the straight line path defined by the vertical duct section 36 and conveyor tube 38 leading therefrom. The mounting location of the air jet 52 causes the air flow to be directed along a substantially straight line path between the of the air jet 52 and the cotton receptacle 20.

As shown in FIG. 3, the generally vertical duct section 36 has a generally rectangular walled configuration. The outlet 56 of the air jet 52 extends substantially the full width of the duct section 36 to enhance the flow of air and cotton therethrough. Air from a blower or fan (not shown) mounted on the harvester frame is distributed to each air nozzle through large supply conduits or lines 58.

In operation, the cotton picked from the plants is directed rearwardly from the housing 26 toward the rear panel 46 of the discharge compartment 32. The harvested cotton falls toward the suction opening and is drawn along with atmospheric air therethrough as a result of an induced draft created by a high speed air stream being propelled from the outlet end 56 of the air nozzle 50.

A salient feature of the present invention concerns the mounting location of the air nozzle 50 relative to the duct structure. Mounting the air nozzle at a foremost lower location of the vertical duct section 36 minimizes the entrained suction length extending between the air nozzle 50 and the suction opening 48. Minimizing the entrained suction length thereby reduces the susceptibility of the duct structure to plugging especially in high yield conditions. Moreover, the location of the air nozzle provides a substantially straight line path for the entrained cotton as it is propelled upwardly past an outlet end of the nozzle and upwardly through the conveyor tube. Aligning the nozzle with the straight line path of the upright duct section 36 conveyor tube 38 provides a clearer path for the cotton and enhances overall operation of the duct assembly.

From the foregoing, it will be observed that numerous modifications and variations can be effected without departing from the true spirit and scope of the novel concept of the present invention. It will be appreciated that the present disclosure is intended as an exemplification of the invention and is not intended to limit the invention to the specific embodiment illustrated. The disclosure is intended to cover by the appended claims all such modifications as fall within the scope of the claims.

What is claimed is:

1. A cotton harvester with a duct system for receiving and pneumatically transporting cotton removed from cotton plants by a harvesting unit having a harvesting mechanism, said duct system comprising:

duct structure arranged rearwardly of and for directing cotton from said harvesting unit, said duct structure including a generally horizontal duct section comprised of a walled structure including top and bottom walls joined by side walls and having an inlet end defining an opening arranged in cotton receiving relation toward a lower end of the harvesting mechanism, and a generally vertical duct section joined to and angularly offset from the horizontal duct section, said vertical duct section being comprised of a walled structure including front and rear walls joined by side walls extending in generally straight line alignment and cotton conveying relation with a vertical conveyor tube, said top, bottom and side walls of the horizontal duct section being joined to said front, back and side walls of the vertical duct section, respectively; and air nozzle means extending to an interior of said duct structure downstream of said opening for directing a primary air stream axially upward in the vertical duct section of said duct structure to induce a secondary stream of air flowing from the inlet end of said duct structure toward said vertical duct section thereby drawing cotton through said opening and toward said vertical duct section, said nozzle means being mounted at a foremost lower location on said vertical duct section and adjacent the horizontal duct section such that the secondary air stream will tend to flow along the bottom and rear walls of the horizontal and vertical sections in those areas to which cotton gravitates and to minimize the distance wherein cotton is entrained with the secondary stream of air thereby reducing the susceptibility of the duct system to plugging while providing a substantially straight line path for air and cotton passing downstream of said nozzle means to and through said conveyor tube.

2. The cotton harvester according to claim 1 wherein the duct sections of the duct structure have a generally rectangular cross-sectional configuration, and wherein the outlet of said air nozzle means extends substantially across the width of vertical duct section.

3. A cotton harvester with a harvesting unit having an upright rotatable harvesting mechanism, a cotton receptacle for receiving harvested cotton, an elongated duct system for pneumatically transporting cotton to said receptacle, said duct system comprising:

duct structure including a receiving chamber vertically extending substantially the length of and which is adapted to receive cotton from the harvesting mechanism and whereby the force of gravity will move cotton received in said chamber toward an opening arranged at a lower end of said chamber, said duct structure further including a generally horizontal walled section extending from the opening at the lower end of said receiving chamber, said horizontal walled section including top and bottom walls which are joined by side walls, and is joined to a generally vertical walled section, wherein said vertical section angles upwardly from the horizontal section and is in general straight line alignment and cotton conveying relationship with a conveyor tube, said vertical walled section including front and rear walls joined by side walls, with said top, bottom and side walls of said horizontal walled section being joined to said front, rear and side walls of said vertical walled section, respectively; and air nozzle means arranged downstream of said opening and extending to an interior of said duct structure for directing a primary air flow axially upward in the vertical section of the duct structure whereby inducing a secondary air flow at the opening in said duct structure upstream of said nozzle means and thereby drawing cotton toward and through said opening, said air nozzle means including an air jet passing through and fixed to said vertical section at a foremost lower end thereof adjacent to the horizontal walled section such that the secondary flow of air will tend to flow along the bottom and rear walls of the horizontal and vertical walled sections, respectively, of the duct structure in those areas to which cotton gravitates and to minimize the distance in which cotton is entrained with the secondary air flow thereby reducing the susceptibility of the duct system to plugging while propelling the cotton along a substantially straight line path defined downstream of said air jet and extending toward said receptacle.

4. The cotton harvester according to claim 3 wherein said air jet has a tapered configuration with an outlet end being at the smaller end of the air jet and air is introduced at a relatively low velocity into the air jet and discharged at a comparatively high velocity through the outlet end of the air jet.

* * * * *